(12) United States Patent
Falkenstern et al.

(10) Patent No.: US 10,455,112 B2
(45) Date of Patent: *Oct. 22, 2019

(54) OPTIMIZING OPTICAL SCANNERS FOR DIGITAL WATERMARK DETECTION

(71) Applicant: Digimarc Corporation, Beaverton, OR (US)

(72) Inventors: Kristyn R. Falkenstern, Portland, OR (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,863

(22) Filed: Aug. 7, 2017

(65) Prior Publication Data

US 2018/0131837 A1 May 10, 2018

Related U.S. Application Data

(63) Continuation of application No. 14/946,180, filed on Nov. 19, 2015, now Pat. No. 9,727,941.
(Continued)

(51) Int. Cl.
*G06K 19/00* (2006.01)
*H04N 1/32* (2006.01)
(Continued)

(52) U.S. Cl.
CPC ... *H04N 1/32309* (2013.01); *G06K 19/06009* (2013.01); *G06T 1/0028* (2013.01);
(Continued)

(58) Field of Classification Search
CPC .......... G06T 1/0042; G06T 1/005; G06T 2201/0051; G06T 2201/0065;
(Continued)

(56) References Cited

U.S. PATENT DOCUMENTS 4,652,911 A * 3/1987 Teranishi ............... G02B 5/201
348/279
5,862,260 A 1/1999 Rhoads
(Continued)

FOREIGN PATENT DOCUMENTS

FR 2905185 A1 2/2008
WO 2008152922 A1 12/2008
(Continued)

OTHER PUBLICATIONS

International Search Report and Written Opinion dated Oct. 24, 2014 from PCT/US2014/041417.
(Continued)

*Primary Examiner* — Ping Y Hsieh
(74) *Attorney, Agent, or Firm* — Digimarc Corporation

(57) ABSTRACT

The present disclosure relates generally to digital watermarking for retail product packaging. A digital watermark can be carried in different color channels, and at with different signal polarities. Detection can utilize different illumination sources or image sensors with various filters to highlight signal in one or more of the channels.

18 Claims, 4 Drawing Sheets
(4 of 4 Drawing Sheet(s) Filed in Color)

Related U.S. Application Data

(60) Provisional application No. 62/081,756, filed on Nov. 19, 2014, provisional application No. 62/089,056, filed on Dec. 8, 2014.

(51) Int. Cl.
   *H04N 1/48* (2006.01)
   *H04N 1/028* (2006.01)
   *G06T 1/00* (2006.01)
   *G06K 19/06* (2006.01)

(52) U.S. Cl.
   CPC ..... *H04N 1/02805* (2013.01); *H04N 1/02845* (2013.01); *H04N 1/482* (2013.01); *G06T 2201/0051* (2013.01); *H04N 2201/327* (2013.01); *H04N 2201/3226* (2013.01)

(58) Field of Classification Search
   CPC ............. G06T 1/0021; H04N 1/32144; H04N 1/32251; H04N 1/32288; H04N 1/32309; H04N 1/6008
   See application file for complete search history.

(56) References Cited

U.S. PATENT DOCUMENTS

| | | | |
|---|---|---|---|
| 6,069,696 A | 5/2000 | McQueen | |
| 6,122,403 A | 9/2000 | Rhoads | |
| 6,345,104 B1 | 2/2002 | Rhoads | |
| 6,363,366 B1 | 3/2002 | Henty | |
| 6,408,082 B1 | 6/2002 | Rhoads | |
| 6,449,377 B1 | 9/2002 | Rhoads | |
| 6,466,961 B1 | 10/2002 | Miller | |
| 6,590,996 B1 | 7/2003 | Reed | |
| 6,614,914 B1 | 9/2003 | Rhoads | |
| 6,718,046 B2 | 4/2004 | Reed | |
| 6,721,440 B2 | 4/2004 | Reed | |
| 6,763,123 B2 | 7/2004 | Reed | |
| 6,891,959 B2 | 5/2005 | Reed | |
| 6,912,295 B2 | 6/2005 | Reed | |
| 6,947,571 B1 | 9/2005 | Rhoads | |
| 7,028,901 B2 | 4/2006 | Carlson | |
| 7,152,786 B2 * | 12/2006 | Brundage | G06K 19/16 235/380 |
| 7,196,829 B2 * | 3/2007 | Vook | H04N 1/648 348/E9.01 |
| 7,213,757 B2 | 5/2007 | Jones | |
| 7,319,990 B1 | 1/2008 | Henty | |
| 7,364,085 B2 | 4/2008 | Jones | |
| 7,393,119 B2 | 7/2008 | Lebens | |
| 7,420,663 B2 | 9/2008 | Wang | |
| 7,471,807 B2 * | 12/2008 | Asano | G06T 1/0064 382/100 |
| 7,546,954 B2 | 6/2009 | Longacre, Jr. | |
| 7,667,766 B2 | 2/2010 | Lee | |
| 7,738,673 B2 | 6/2010 | Reed | |
| 7,938,331 B2 | 5/2011 | Brock | |
| 7,963,450 B2 | 6/2011 | Lawandy | |
| 7,995,911 B2 | 8/2011 | Butterworth | |
| 8,027,509 B2 * | 9/2011 | Reed | G06T 1/0028 382/100 |
| 8,061,610 B2 | 11/2011 | Nunnink | |
| 8,199,969 B2 | 6/2012 | Reed | |
| 8,224,018 B2 | 7/2012 | Rhoads | |
| 8,277,990 B2 | 10/2012 | Umayahara | |
| 8,284,279 B2 | 10/2012 | Park | |
| 8,358,089 B2 | 1/2013 | Hsia | |
| 8,364,031 B2 | 1/2013 | Geffert | |
| 8,385,971 B2 | 2/2013 | Rhoads | |
| 8,452,044 B2 * | 5/2013 | Yogo | B41M 3/10 358/3.28 |
| 8,500,023 B2 | 8/2013 | Zolotov | |
| 8,584,953 B2 | 11/2013 | Zolotov | |
| 8,805,110 B2 | 8/2014 | Rodriguez | |
| 8,879,735 B2 | 11/2014 | Lord | |
| 8,888,207 B2 | 11/2014 | Furness | |
| 9,008,315 B2 | 4/2015 | Lord | |
| 9,117,268 B2 | 8/2015 | Reed | |
| 9,179,033 B2 | 11/2015 | Reed | |
| 9,224,184 B2 | 12/2015 | Bai | |
| 9,380,186 B2 | 6/2016 | Reed | |
| 9,727,941 B1 | 8/2017 | Falkenstern | |
| 9,749,607 B2 | 8/2017 | Boles | |
| 2002/0001080 A1 | 1/2002 | Miller | |
| 2002/0012461 A1 | 1/2002 | MacKinnon | |
| 2002/0121590 A1 | 9/2002 | Yoshida | |
| 2003/0062413 A1 | 4/2003 | Gardiner | |
| 2004/0197816 A1 | 10/2004 | Empedocles | |
| 2004/0239528 A1 | 12/2004 | Luscombe | |
| 2004/0263911 A1 | 12/2004 | Rodriguez | |
| 2005/0011956 A1 | 1/2005 | Carlson | |
| 2005/0030416 A1 | 2/2005 | Kametani | |
| 2005/0030533 A1 | 2/2005 | Treado | |
| 2005/0156048 A1 | 7/2005 | Reed | |
| 2006/0008112 A1 | 1/2006 | Reed | |
| 2006/0133061 A1 | 6/2006 | Maeda | |
| 2006/0161788 A1 | 7/2006 | Turpin | |
| 2006/0198551 A1 | 9/2006 | Abe | |
| 2006/0202028 A1 | 9/2006 | Rowe | |
| 2006/0251408 A1 | 11/2006 | Konno | |
| 2007/0108284 A1 | 5/2007 | Pankow | |
| 2007/0143232 A1 | 6/2007 | Auslander | |
| 2007/0217689 A1 | 9/2007 | Yang | |
| 2007/0268481 A1 | 11/2007 | Raskar | |
| 2008/0101657 A1 | 5/2008 | Durkin | |
| 2008/0112596 A1 | 5/2008 | Rhoads | |
| 2008/0133389 A1 | 6/2008 | Schowengerdt | |
| 2008/0177185 A1 | 7/2008 | Nakao | |
| 2008/0297644 A1 | 12/2008 | Farchtchian | |
| 2009/0067695 A1 | 3/2009 | Komiya | |
| 2009/0086506 A1 | 4/2009 | Okumura | |
| 2009/0112101 A1 | 4/2009 | Furness | |
| 2009/0243493 A1 | 10/2009 | Bergquist | |
| 2010/0042004 A1 | 2/2010 | Dhawan | |
| 2010/0048242 A1 | 2/2010 | Rhoads | |
| 2010/0073504 A1 | 3/2010 | Park | |
| 2010/0142003 A1 | 6/2010 | Braun | |
| 2010/0150396 A1 | 6/2010 | Reed | |
| 2010/0150434 A1 | 6/2010 | Reed | |
| 2010/0200658 A1 | 8/2010 | Olmstead | |
| 2010/0208240 A1 | 8/2010 | Schowengerdt | |
| 2011/0007935 A1 | 1/2011 | Reed | |
| 2011/0037873 A1 | 2/2011 | Hu | |
| 2011/0098029 A1 | 4/2011 | Rhoads | |
| 2011/0123185 A1 | 5/2011 | Clark | |
| 2011/0212717 A1 | 9/2011 | Rhoads | |
| 2011/0304705 A1 | 12/2011 | Kantor | |
| 2012/0243009 A1 | 9/2012 | Chapman | |
| 2012/0321759 A1 | 12/2012 | Marinkovich | |
| 2013/0126618 A1 | 5/2013 | Gao | |
| 2013/0195273 A1 | 8/2013 | Lord | |
| 2013/0308045 A1 | 11/2013 | Rhoads | |
| 2013/0329006 A1 | 12/2013 | Boles | |
| 2013/0335783 A1 | 12/2013 | Kurtz | |
| 2014/0085534 A1 | 3/2014 | Bergquist | |
| 2014/0112524 A1 | 4/2014 | Bai | |
| 2014/0293091 A1 | 10/2014 | Rhoads | |
| 2015/0156369 A1 | 6/2015 | Reed | |
| 2016/0187199 A1 | 6/2016 | Brunk | |
| 2016/0198064 A1 | 7/2016 | Bai | |
| 2018/0039805 A1 | 2/2018 | Boles | |

FOREIGN PATENT DOCUMENTS

| | | | |
|---|---|---|---|
| WO | 2012047340 A1 | 4/2012 | |
| WO | 2013109934 A1 | 7/2013 | |

OTHER PUBLICATIONS

International Search Report and Written Opinion dated Nov. 4, 2014 from PCT/US2014/050573.

(56) References Cited

OTHER PUBLICATIONS

Silverbrook Research U.S. Appl. No. 61/350,013, filed May 31, 2010.
Office Action dated Jul. 17, 2013, in U.S. Appl. No. 13/444,521.
U.S. Appl. No. 13/888,939, filed May 7, 2013.
Office Action dated Jul. 1, 2016 in U.S. Appl. No. 14/681,832.
Office Action dated Jul. 29, 2016 in U.S. Appl. No. 14/946,180.
Park, et al, "Multispectral Imaging Using Multiplexed Illumination," in Computer Vision, 2007. ICCV 2007. IEEE 11th International Conference on , vol., No., pp. 1-8.
Bolle, et al., 'VeggieVision: A Produce Recognition System', Proceedings of the Third IEEE Workshop on 30 Applications of Computer Vision, pp. 224-251, 1996.
Chi, et al, Multi-spectral imaging by optimized wide band illumination, International Journal of Computer Vision 86.2-3 (2010), pp. 140-151.
Everdell, et al, Multispectral imaging of the ocular fundus using LED illumination, European Conference on Biomedical Optics, Optical Society of America, 2009.
Nieves, et al., Multispectral synthesis of daylight using a commercial digital CCD camera Aoolied Ootics 44.27 (2005V 5696-5703.
Willis et al., 'InfraStructs: Fabricating Information Inside Physical Objects for Imaging in the Terahertz Region', ACM Transactions on Graphics, vol. 32, No. 4, Jul. 1, 2013.
Schockling, et al, Visualization of hyperspectral images, SPIE Defense, Security, and Sensing, 2009.

\* cited by examiner

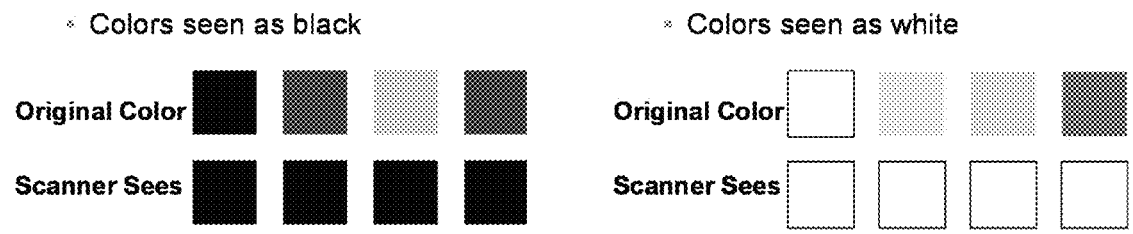
Fig. 1
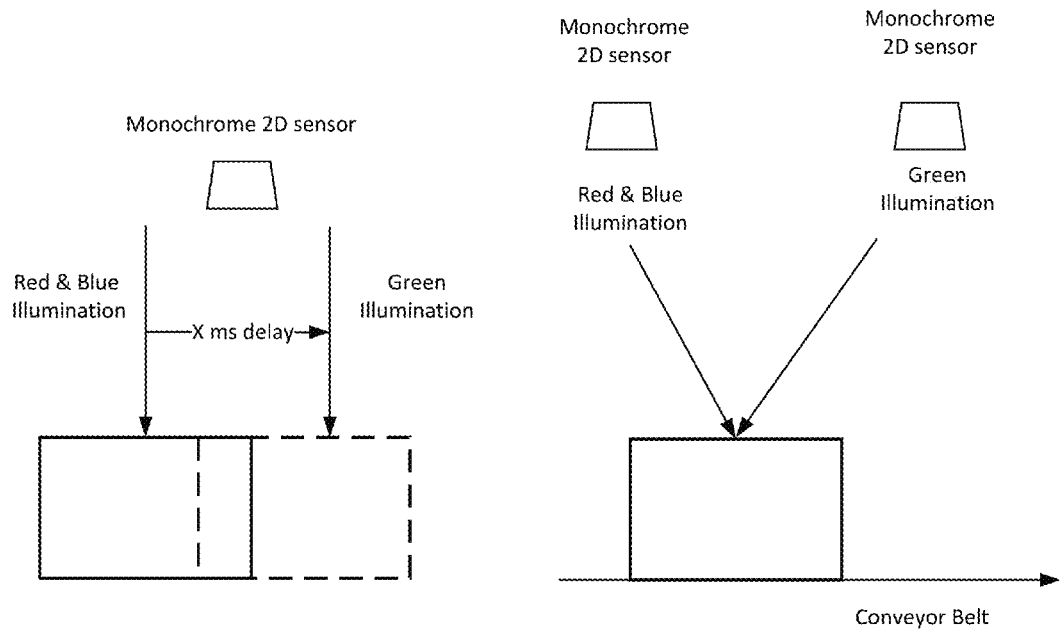
Fig. 2
Fig. 4

OPTIMIZING OPTICAL SCANNERS FOR DIGITAL WATERMARK DETECTION

RELATED APPLICATION DATA

This application is a continuation of U.S. application Ser. No. 14/946,180, filed Nov. 19, 2015 (now U.S. Pat. No. 9,727,941), which claims the benefit of U.S. Provisional Patent Application Nos. 62/081,756, filed Nov. 19, 2014 and 62/089,056, filed Dec. 8, 2014. Each of these patent documents is hereby incorporated herein in its entirety.

This application is also related to U.S. patent application Ser. No. 14/616,686, filed Feb. 7, 2015 (published as US 2015-0156369 A1, issued as U.S. Pat. No. 9,380,186), Ser. No. 14/725,399, filed May 29, 2015 (issued as U.S. Pat. No. 9,635,378), Ser. No. 13/804,413, filed Mar. 14, 2013 (published as US 2014-0112524 A1, issued as U.S. Pat. No. 9,224,184), Ser. No. 14/836,878, filed Aug. 26, 2015 (published as US 2016-0187199 A1), and Ser. No. 14/932,645, filed Nov. 4, 2015 (issued as U.S. Pat. No. 9,667,829); U.S. Provisional Patent Application No. 62/255,181, filed Nov. 13, 2015; and U.S. Pat. Nos. 8,199,969, 8,277,990, 9,117,268, US 2010-0150434 A1 and US 2013-0329006 A1. Each of the above patent documents is hereby incorporated herein by reference in its entirety.

TECHNICAL FIELD

The present disclosure relates generally to steganographic data hiding and digital watermarking, particularly for product packaging. Additionally, this disclosure relates to optimizing scanners (e.g., barcode scanners) for digital watermark detection.

BACKGROUND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403, 5,862,260, and US 2015-0156369 A1, application Ser. No. 14/725,399 (issued as U.S. Pat. No. 9,635,378), and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One aspect of the disclosure is an apparatus comprising: a first LED providing illumination in the red spectrum; a second LED providing illumination in the blue spectrum; a third LED providing illumination in the green spectrum; a first 2D monochrome image sensor; a controller module for controlling illumination from the first LED, the second LED and the third LED; a watermark detection module for analyzing imagery captured by the first 2D monochrome image sensor. The imagery comprises a first image capture corresponding to illumination by the first LED and the second LED, minus a second image capture corresponding the illumination by the third LED. The first image capture comprises data representing a cyan channel and yellow channel, with each of the cyan channel and the yellow channel comprising a digital watermark embedded therein at a first signal polarity. The second image capture comprises data representing a magenta channel, the magenta channel comprising a digital watermark embedded therein at a second signal polarity that is inversely related to the first signal polarity.

Another aspect of the disclosure is an apparatus comprising: a first LED providing illumination in the red spectrum; a second LED providing illumination in the blue spectrum; a third LED providing illumination in the green spectrum; a first 2D monochrome image sensor; a second 2D monochrome image sensor; a controller module for controlling illumination from the first LED, the second LED and the third LED, in which the controller controls illumination from the first LED and the second LED at a time t, and then controls illumination from the third LED at a time t+x, where x is a time measured in milliseconds; and a watermark detection module. The watermark detection module analyzes imagery captured by the first 2D monochrome image sensor, in which the imagery comprises a first image capture corresponding to illumination by the first LED and the second LED, minus a second image capture captured by the second 2D monochrome image sensor. The second image captured corresponds to the illumination by the third LED, in which the first image capture comprises data representing a cyan channel and yellow channel, with each of the cyan channel and the yellow channel comprising a digital watermark embedded therein at a first signal polarity. The second image capture comprises data representing a magenta channel, the magenta channel comprising a digital watermark embedded therein at a second signal polarity that is inversely related to the first signal polarity.

Yet another aspect of the disclosure also relates to an apparatus comprising: an image sensor comprising rows and columns of photo-sensors; a first set of green filters overlaying a first set of photo-sensors; and a first set of magenta filters overlaying a second set of photo-sensors. The apparatus also comprises a digital watermark detector module configured to detect a digital watermark from a grayscale image comprising image data captured by the first set of magenta filters minus image data captured by the first set of green filters.

Further combinations, aspects, features and advantages will become even more apparent with reference to the following detailed description and accompanying drawing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows various colors and their grayscale representation ("scanner sees") as seen by a POS scanner with a red LED illumination at or around 660 nm.

FIG. 2 is a diagram showing image data capture of a printed package with a delayed illumination.

FIG. 3A is a diagram of a portion of an image sensor showing color filters variously arranged.

FIG. 3B is another diagram of a portion of an image sensor showing different color filters variously arranged.

FIG. 4 is a diagram showing image data capture of a printed packaging moving along a conveyor belt at a retail check out.

DETAILED DESCRIPTION

Digital watermarking can be advantageously employ in product packaging and other retail materials. Retail scanners at Point of Sale (POS) tend to be tuned to detect black and white barcodes from monochrome 2D imagery in a red spectral wavelength, e.g., at or around 660 nm or at or around 690 nm ("POS scanner"). When we use the term "at or around 660 nm," we mean a wavelength within the range of 640-680 nm. In one particular example, a red illumination scanner includes a wavelength in the range of 650-670 nm, and may be centered or include a peak in this range, e.g., at 660 nm. In another example, a red illumination scanner includes a wavelength in the range of 650-710 nm. We refer to this last example as "at or around 690 nm". Other scanners may be centered or include a peak, e.g., at 688-690 nm.

An example 660 nm type of POS scanner is the 9800i, by Datalogic ADC Inc. (offices in Eugene, Oreg.). Other POS barcode scanners have different spectral responses, e.g., centered at or around 690 nm, such as the MP6000 scanner, by Zebra Technologies Corporation (offices in Lincolnshire, Ill.).

POS scanners only 'see' colors which reflect or absorb at or around their operational wavelength (e.g., at or around 660 nm or at or around 690 nm). If a color strongly reflects at this wavelength the camera 'sees' white. Bright yellows, magenta, pink, orange and white are all 'seen' as white by the capture device. If a color has a low reflection at this wavelength (e.g., absorbs the wavelength) the camera 'sees' black. Dark blue, cyan, green, purple and black are all 'seen' as black by the camera. FIG. 1 illustrates this arrangement.

Improvements can be made to such a POS scanners to improve watermark detection.

One such improvement is described in context of watermarking product packaging, e.g., such as might be performed in assignee's US 2015-0156369 A1. For example, a watermark signal may be carried with a Cyan (C), Magenta (M) and Yellow (Y) tint. Watermark signal can be emphasized in the cyan channel to optimize robustness for a scanner with red illumination. Cyan absorbs at or around the peak illumination of typical POS red illumination scanners so cyan can register black pixel values and is suitable for carrying signal elements. (A watermark signal can be viewed as a small grayscale difference which can be anywhere in the scanner tonal range from shadows to highlights. This means that scanner linearity over the whole tonal range improves watermark detection.)

As discussed in some of the above related patent documents, and for visibility reasons, a watermark signal can be also embedded into magenta and yellow. In some cases, the magenta signal may include an opposite signal polarity relative to cyan and yellow to reduce overall signal visibility. For example, the opposite signal polarity in the different channels helps cancel perceived luminance changes due to the embedded digital watermark signal.

Figure 8:
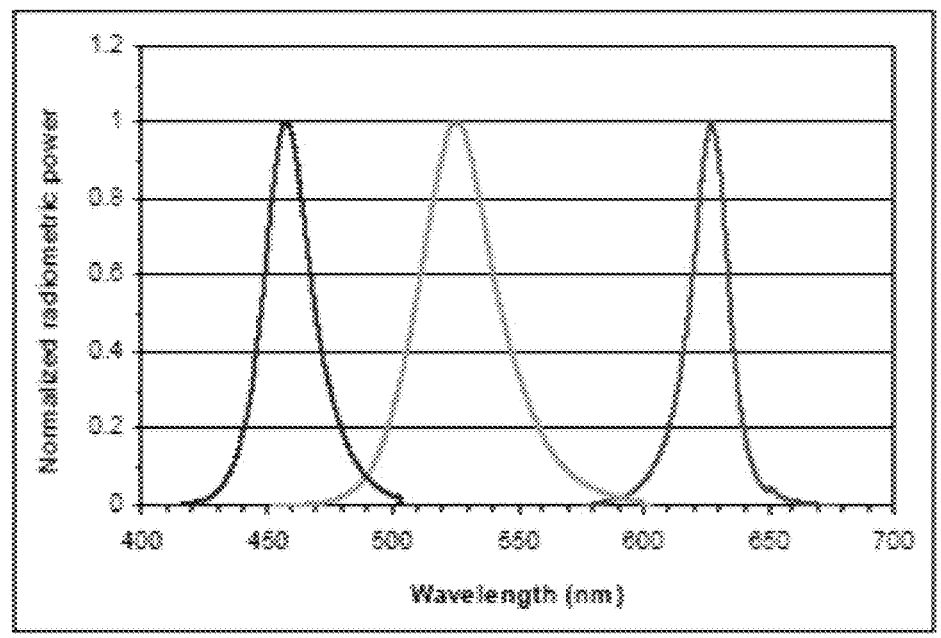
FIG. 8 illustrates various wavelength ranges for blue, green and red LEDs.

Watermark signal robustness can be increased if a POS scanner is also capable of reading such a watermark signal from the magenta and yellow channels. Reading the watermark signal from magenta and yellow utilizes green and blue illumination, in addition to red illumination. Blue illumination can be used at the same time as red with a 2-dimensional monochrome sensor and the signal will be added optically (with both the cyan and yellow signals captured). We expect about 30% increase in watermark signal detected when using both red and blue illumination. FIG. 8 shows one example of a normalized power for various LEDs (blue, green and red). Typically, we would expect a blue LED to have a peak illumination in the range of 410 nm-490 nm, a green LED to have a peak illumination in the range of 500 nm-565 nm, and a red LED to have a peak in the range of 630 nm-710 nm. Please see assignee's US Published Patent Application No. US 2013-0329006 A1 and U.S. patent application Ser. No. 14/836,878, filed Aug. 26, 2015 (published as US 2016-0187199 A1), which are each hereby incorporated herein by reference in their entirety, for a related discussion.

If green illumination is also added to a POS scanner, and if used at the same time as red and blue illumination, a color sensor can be used to separate the color planes. Once separated, the color planes can be subtracted from each other. For example, recall from above that a watermark signal may comprise opposite polarities in different channels, so subtracting the different color planes maximizes the watermark signal while reducing the interference due to image content. A color image sensor with a watermark pattern color filter can facilitate image capture in an optimum way which maximizes the light falling on the sensor (see, e.g., FIGS. 3A & 3B).

CMOS imagers are well known in the art, e.g., see U.S. Pat. Nos. 6,645,788, 6,654,057, 6,639,261, 5,708,263 and 5,471,515, which are each herein incorporated by reference. The literature is also full of illustrative work including, e.g., Nixon et al., "256.times.256 CMOS Active Pixel Sensor Camera-on-a-Chip," IEEE Journal of Solid-State Circuits, Vol. 31(12) pp. 2046-2050, 1996; and Mendis et al, "CMOS Active Pixel Image Sensors," IEEE Transactions on Electron Devices, Vol. 41(3) pp. 452-453, 1994, which are each herein incorporated by reference.

A CMOS imager circuit may include a focal plane array of pixel cells, each one of the cells including a photo-detector, e.g., a photogate, photoconductor or a photodiode, overlying a substrate for accumulating photo-generated charge in the underlying portion of the substrate. A readout circuit is connected to pixel cells and may include an output field effect transistor formed in the substrate and a charge transfer section formed on the substrate adjacent the photo-gate, photoconductor or photodiode having a sensing node, typically a floating diffusion node, connected to the gate of an output transistor. The imager may include an electronic device (such as a transistor) for transferring charge from the underlying portion of the substrate to the floating diffusion node and a device for resetting the node to a predetermined charge level prior to charge transference. In an exemplary CMOS imager, the active elements of a pixel cell preferably perform functions, e.g., of: (1) photon (e.g., light) to charge conversion; (2) accumulation of image charge; (3) transfer of charge to the floating diffusion node accompanied by charge amplification; (4) resetting a floating diffusion node to a known state; (5) selection of a pixel or image area for readout; and (6) output and amplification of a signal representing pixel charge. (Of course, our inventive techniques apply to other on-chip imagers including CCD sensors and other CMOS configurations. Thus, the above imager description illustrates only a few of the many possible environments in which our inventive techniques flourish.).

Figures 3A, 3B:
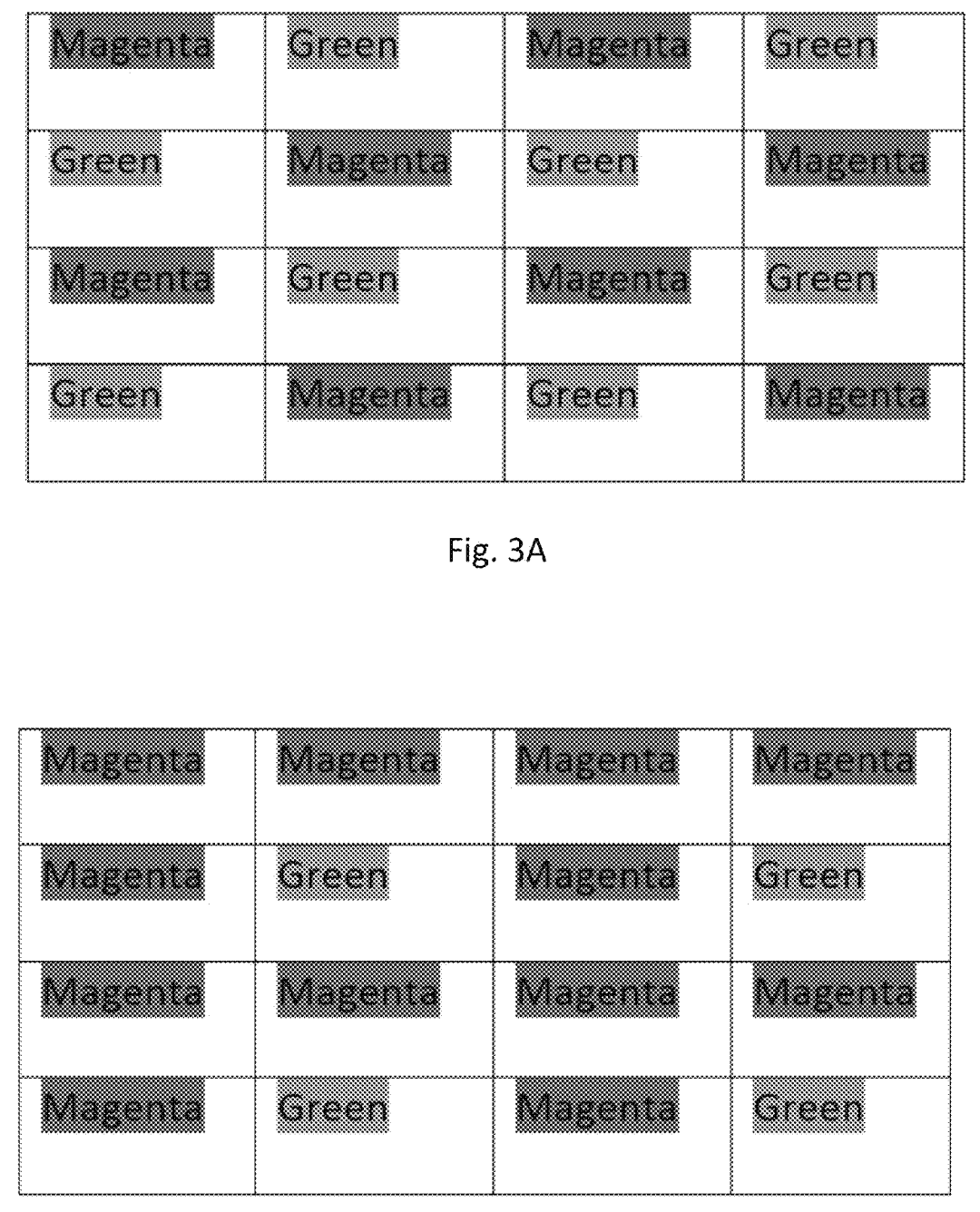

In FIG. 3A, a magenta filter and a green filter overlay individual pixel cells or groups of pixel cells. As photons pass through the filter to reach the photo-detector, only wavelengths corresponding to a particular color lens reach the photo-detectors. The magenta filter captures data corresponding to a printed cyan and yellow channel. And a green filter captures data corresponding to a printed magenta color channel. The magenta filters and the green filters are arranged in a 1:1 ratio across the sensor, preferably with one such filter being adjacent arranged to the other filter and diagonally arranged to the same filter. The magenta filter (capturing imagery corresponding to the cyan and yellow channels) optically adds (or combines) the watermark signal from the cyan and yellow channels. The green filter, captures imagery corresponding to the magenta channel including the watermark signal. Image data from the green filtered channel is subtracted from the image data from the magenta filtered channel. If the watermark signal in the magenta channel comprises an opposite polarity compared to the cyan and yellow channel, then the watermark signal is enhanced while the image data is reduced.

An alternative arrangement is shown with respect to FIG. 3B, where magenta filters are arranged across an image sensor in a 4:1 ratio relative to green filters. Here, the cyan color channel is emphasized relative to the magenta color channel during image capture. The green filtered imagery can be subtracted from the magenta captured imagery to yield an increased watermark signal compared to reduce image content.

If using one monochrome 2D image sensor, without filters, green illumination can be pulsed with a delay (e.g., $\frac{1}{40}$ Hz to $\frac{1}{80}$ Hz, preferably $\frac{1}{60}$ Hz) relative to the blue and red illumination. Two captures with the monochrome sensor can be made, with the one capture corresponding to green illumination being subtracted from the one capture corresponding to the blue and red illuminations. The watermark signal is enhanced while image content is decreased. E.g., the watermark signal captured with the blue illumination and the red illumination (corresponding to yellow and cyan color data) has the same polarity while the signal captured with green illumination (corresponding to magenta data) has the opposite polarity. The resulting grayscale image comprises: Gray=Red illumination+Blue illumination−Green illumination. See, e.g., FIG. 2 for illustration of a gated illumination, with a delay for the green illumination. The printed package may be moving along a conveyor belt, e.g., as shown in FIG. 3. The FIG. 2 arrangement can also be modified to include 2 image sensors. Watermark detection can be performed on the grayscale image to detect the digital watermark.

In a similar approach, a handheld barcode scanner is used to temporally scan a digitally watermarked package. Alignment of the 2 frames should be reasonably accurate if the user is attempting to hold the hand held device stationary. A green illumination frame could be aligned with the blue and red illuminations frame, by performing a 2D translation and correlation with image features.

Another approach utilizes spatial multiplex color illumination as shown in FIG. 4. A digitally watermarked package moves along a path (e.g., a conveyor belt). The package is illuminated with red illumination and blue illumination. A first monochrome 2D sensor captures image data corresponding to both the red (cyan channel) and blue (yellow channel) printed information; as discussed above, the cyan and blue channels are optically added. A digital watermark detector analyzing the captured data extracts a digital watermark signal from the cyan and yellow captured data. The package moves along the path for x milliseconds (or seconds) where it encounters green illumination. A second monochrome 2D sensor captures image data (grayscale) corresponding to the green illumination (e.g., magenta color channel). A digital watermark detector analyzes the captured magenta data and extracts the watermark signal. The two cameras are preferably aligned so that the same package region is read. The decoded watermarks can be compared to see if they correspond. Or, a retail checkout station can be configured to ring up the packaged item if one out of the two watermark are read. (In other implementations a beam splitter is used instead of different illumination sources.)

In some cases a K channel (black) is used to convey a digital watermark signal. In these cases, an IR pass filter can be used to detect the digital watermark in K channel. For example, see assignee's U.S. Pat. No. 6,763,123 for a discussion of infrared detection. The U.S. Pat. No. 6,763,123 patent is hereby incorporated herein by reference in its entirety.

To avoid burdensome computation, a filter arrangement, e.g., as shown in FIG. 3A could be used together with an optical blur so that digital averaging is not required when down sampling. For example if sampling rate is 300 dpi but a digital watermark detector only needs, e.g., 150 dpi data, averaging can be performed optically by optical blur. The filter arrangement in FIG. 3A can also be used together with optical blur and hardware averaging so that processor averaging is not required when down sampling. For example if a sampling rate is 300 dpi, but a digital watermark detector only needs 75 dpi data for detection, optical averaging to 150 dpi can be followed by a hardware stage to down sample to 75 dpi, where 2 by 2 pixels are averaged and sub-sampled.

One such hardware implementation is electronic circuitry that has been custom-designed and manufactured to perform some or all of the embedding and detecting acts, as an application specific integrated circuit (ASIC). To realize such an ASIC implementation, some or all of the technology is first implemented using a general purpose computer, using software such as MatLab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 5:
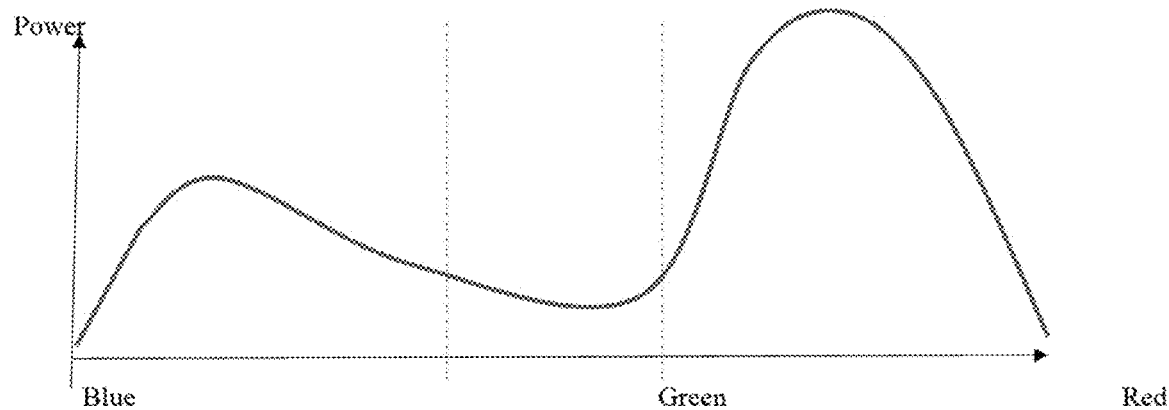
FIG. 5 is a diagram illustrating broadband illumination.

Illumination is often broadband for color rendering, e.g., the color spectrum approximates black body radiation like daylight. Broadband illumination with a monochrome sensor is not preferred for detection of a watermark carried with different polarities in different color channels since negative tweaks used to avoid luminance changes are subtracted by optical integration. To avoid this, the power of the broadband illumination can be reduced or filtered in the spectral region which has negative tweaks. The spectral region is identified by the vertical lines in FIG. 5.

Figure 6:
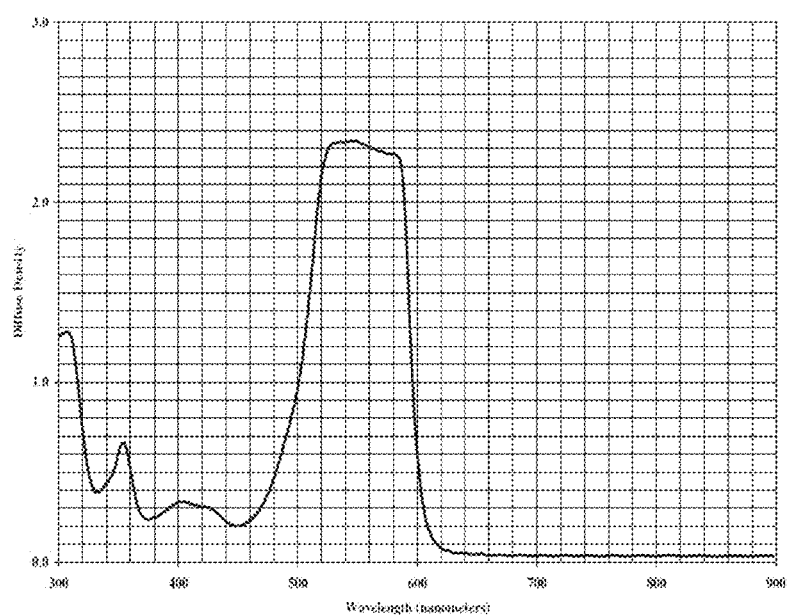
FIG. 6 show a spectral response of a Wratten 32 Magenta Filter.

The filtering can be achieved, e.g., with a photographic filter which uses, e.g., a dye (see FIG. 6) or an interference filter such as a Dichroic filter. FIG. 6 illustrates a 32 Magenta Wratten filter, e.g., sold as an optical gel filter from Kodak, Inc. The filter appears as a bright magenta filter that removes some blues and green from an optical sensor. An advantage of an interference filter is that the pass band can be made tunable, by having collimated light travel at an angle different from the normal to the filter. In addition, the relative power in the bands which are being added can be in the same ratio as the signal that was embedded, to align detection with embedding.

The result of using a filter is that a watermark signal carried with a color channel (e.g., magenta) and having a negative signal polarity can be filtered out. The remaining captured image data (e.g., corresponding to cyan) can be analyzed to detect a digital watermark signal.

Operating Environment

The components and operations of a digital watermark embedder and detector can be implemented in modules. Notwithstanding any specific discussion of the embodiments set forth herein, the term "module" may refer to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as one or more computer processors comprising one or more individual instruction processing cores, state machine circuitry, or firmware that stores instructions executed by programmable circuitry. Multi-processor platforms (including parallel processors) can also be used to carry out the signal processing features of this disclosure, as can multi-core processors.

Figure 7:
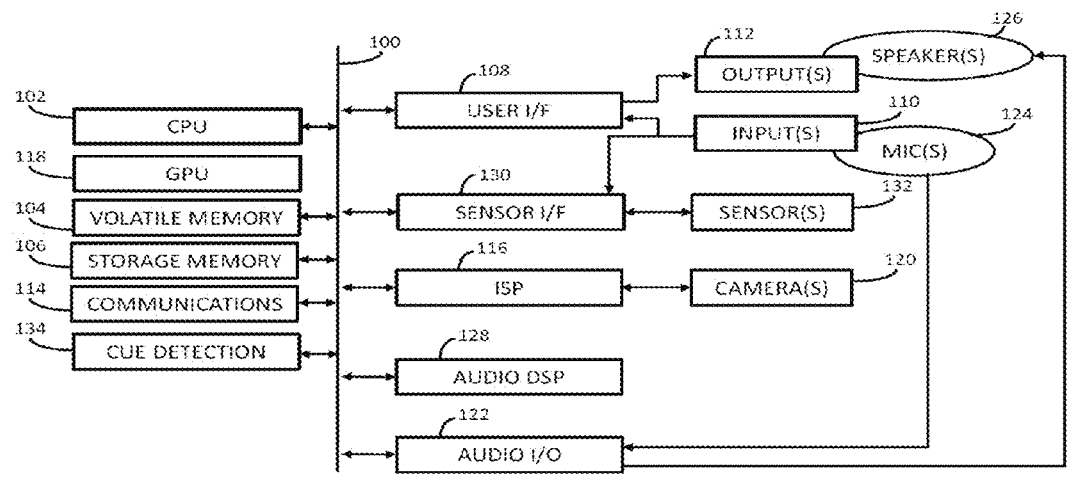
FIG. 7 illustrates an electronic device in which encoding and decoding may be implemented.

For the sake of illustration, FIG. 7 is a diagram of an electronic device in which the components of a digital watermark embedder (or encoder) and detector (or decoder) embodiments may be implemented. It is not intended to be limiting, as the embodiments may be implemented in other device architectures, electronic circuitry, point of sale 2D monochrome barcode scanners, etc. Additionally, components from FIG. 7 can be readily used in such scanners, circuitry and device architectures.

Referring to FIG. 7, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 7 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, embossing, laser marking, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 7, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

What is claimed is:

1. A method comprising:
    illuminating a substrate with a first LED, the first LED providing illumination in a red spectrum, in which the first LED provides illumination having a peak in a range between 630 nm-710 nm;
illuminating the substrate with a second LED, the second LED providing illumination in a blue spectrum, in which the second LED provides illumination having a peak in a range between 410 nm-490 nm;
illuminating the substrate with a third LED, the third LED providing illumination in a green spectrum, in which the third LED provides illumination having a peak in a range between 500 nm-565 nm;
capturing imagery with a 2D monochrome image sensor, in which the captured imagery comprises a first image capture corresponding to illumination by the first LED and the second LED, in which the first image capture comprises data representing a cyan channel and a yellow channel, with each of the cyan channel and the yellow channel comprising a digital watermark embedded therein at a first signal polarity, and in which the captured imagery comprises a second image capture corresponding to illumination by the third LED, in which the second image capture comprises data representing a magenta channel, the magenta channel comprising a digital watermark embedded therein at a second signal polarity that is inversely related to the first signal polarity;
transforming the first image capture by subtracting the second image capture therefrom to yield transformed image data;
analyzing the transformed image data with a digital watermark detector to detect a digital watermark.

2. A point of sale system comprising an image sensor and one or more processors, said one or more processors configured to perform the method of claim 1.

3. The method of claim 1 further comprising introducing a delay between illuminating the substrate with the first LED and illuminating the substrate with the second LED, and illuminating the substrate with the third LED, in which the first LED and the second LED are concurrently illuminated.

4. The method of claim 3 in which the delay comprises a delay in the range of 1/40 Hz to 1/80 Hz.

5. The method of claim 1 in which the 2D monochrome image sensor comprises a first 2D image sensor and a second 2D image sensor, in which the first 2D image sensor captures the first image capture, and in which the second 2D image sensor captures the second image capture.

6. The method of claim 1 in which the captured imagery represents product packaging including an encoded signal printed thereon.

7. A method comprising:
capturing image data with an image sensor, the image sensor comprising rows and columns of photo-detectors, the image sensor comprising a first set of photo-detectors arranged with a first set of green filters, and a second set of photo-detectors arranged with a first set of magenta filters, in which for at least four co-located blocks of photo-detectors, there are two magenta filters diagonally arranged, and two green filters diagonally arranged within each 2×2 block of photo-detectors;
processing the captured image data by subtracting image data captured by the first set of photo-detectors from image data captured by the second set of photo-detectors, said processing yielding processed image data; and
analyzing the processed image data to detect a digital watermark therein.

8. A point of sale system comprising an image sensor and one or more processors, said one or more processors configured to perform the method of claim 7.

9. The method of claim 7 in which the captured image data represents product packaging including digital watermarking.

10. The method of claim 7 in which the digital watermark comprises a signal with a first polarity which is included in the image data captured by the first set of photo-detectors, and a second signal which is included in the image data captured by the second set of photo-detectors, in which the second signal includes a second polarity that is inversely related to the first polarity.

11. A method comprising:
capturing image data with an image sensor, the image sensor comprising rows and columns of photo-detectors, the image sensor comprising a first set of photo-detectors arranged with a first set of green filters, and a second set of photo-detectors arranged with a first set of magenta filters, in which for at least a 4×4 block of photo-detectors the first set of green filters comprises a 1:3 ratio relative to the first set of magenta filters;
processing the captured image data by subtracting image data captured by the first set of photo-detectors from image data captured by the second set of photo-detectors, said processing yielding processed image data; and
analyzing the processed image data to detect a digital watermark therein.

12. A point of sale system comprising an image sensor and one or more processors, said one or more processors configured to perform the method of claim 11.

13. The method of claim 11 in which the captured image data represents product packaging including digital watermarking.

14. The method of claim 11 in which the digital watermark comprises a signal with a first polarity which is included in the image data captured by the first set of photo-detectors, and a second signal which is included in the image data captured by the second set of photo-detectors, in which the second signal includes a second polarity that is inversely related to the first polarity.

15. A method comprising:
capturing image data with an image sensor, the image sensor comprising rows and columns of photo-detectors, the image sensor including a first set of photo-detectors arranged with a first set of green filters, the image sensor also including a second set of photo-detectors arranged with a first set of magenta filters, in which for at least four co-located blocks of 2×2 photo-detectors there are three (3) magenta filters arranged per one (1) green filter within each 2×2 block of photo-detectors;
processing the captured image data by subtracting image data captured by the first set of photo-detectors from image data captured by the second set of photo-detectors, said processing yielding processed image data; and
analyzing the processed image data to detect a digital watermark therein.

16. A point of sale system comprising an image sensor and one or more processors, said one or more processors configured to perform the method of claim 15.

17. The method of claim 15 in which the captured image data represents product packaging including digital watermarking.

18. The method of claim 15 in which the digital watermark comprises a signal with a first polarity which is included in the image data captured by the first set of photo-detectors, and a second signal which is included in the image data captured by the second set of photo-detectors, in which the second signal includes a second polarity that is inversely related to the first polarity.

\* \* \* \* \*